(12) United States Patent  
Rola et al.

(10) Patent No.: US 10,046,400 B2
(45) Date of Patent: Aug. 14, 2018

(54) SYSTEM AND METHOD OF ROBOTIC POSITIONING OF MULTIPLE TOOLS

(71) Applicant: Apex Brands, Inc., Apex, NC (US)

(72) Inventors: Martin Douglas Rola, Lexington, SC (US); Yen-Chien Wang, Woodinville, WA (US)

(73) Assignee: APEX BRANDS, INC., Apex, NC (US)

( * ) Notice: Subject to any disclaimer, the term of this patent is extended or adjusted under 35 U.S.C. 154(b) by 0 days.

(21) Appl. No.: 15/527,577

(22) PCT Filed: Nov. 17, 2015

(86) PCT No.: PCT/US2015/061058
§ 371 (c)(1),
(2) Date: May 17, 2017

(87) PCT Pub. No.: WO2016/081443
PCT Pub. Date: May 26, 2016

(65) Prior Publication Data
US 2017/0355025 A1    Dec. 14, 2017

Related U.S. Application Data

(60) Provisional application No. 62/081,265, filed on Nov. 18, 2014.

(51) Int. Cl.
*B23B 35/00* (2006.01)
*B23B 39/28* (2006.01)
*B25J 11/00* (2006.01)
*G05B 19/402* (2006.01)
(Continued)

(52) U.S. Cl.
CPC .............. *B23B 35/00* (2013.01); *B23B 39/28* (2013.01); *B25J 11/005* (2013.01);
(Continued)

(58) Field of Classification Search
CPC ......... B23B 35/00; B23B 39/14; B23B 39/16; B23B 39/28; B23B 2215/04;
(Continued)

(56) References Cited

U.S. PATENT DOCUMENTS 4,310,958 A    1/1982  Balaud et al.
4,332,066 A *  6/1982  Hailey .................... B23B 31/08
                                            29/26 R
(Continued)

FOREIGN PATENT DOCUMENTS

CN    101898301 A    12/2010
CN    102665591 A     9/2012
(Continued)

OTHER PUBLICATIONS

CN Search Report dated Jan. 31, 2018 in re Chinese Application No. 201580073729.4 filed Jul. 18, 2017.

*Primary Examiner* — Daniel Howell
*Assistant Examiner* — Chwen-Wei Su
(74) *Attorney, Agent, or Firm* — Coats & Bennett, PLLC

(57) ABSTRACT

Systems and methods for robotic positioning of multiple tools. The system may include one or more robotic devices, multiple tools, and one or more controllers. The one or more robotic devices are each configured to connect to the tools, move the tools to a desired work position, and release the tools at the work position. The tools are able to operate mechanically independently from the robotic devices to perform an operation at the position to which they are delivered. After releasing the tools, the robotic devices are able to perform other operations including moving additional tools to different work positions. The one or more controllers oversee the operation of the one or more robotic devices and tools and control the overall operation on a work piece.

15 Claims, 13 Drawing Sheets

(51) Int. Cl.
*B23B 39/16* (2006.01)
*B23B 39/14* (2006.01)

(52) U.S. Cl.
CPC ............ *G05B 19/402* (2013.01); *B23B 39/14* (2013.01); *B23B 39/16* (2013.01); *B23B 2215/04* (2013.01); *G05B 2219/45059* (2013.01); *G05B 2219/45063* (2013.01); *Y10S 901/01* (2013.01); *Y10S 901/14* (2013.01); *Y10S 901/41* (2013.01); *Y10T 408/03* (2015.01); *Y10T 408/368* (2015.01); *Y10T 408/3806* (2015.01)

(58) Field of Classification Search
CPC ........ G05B 19/402; G05B 2219/45059; G05B 2219/45063; B25J 11/005; Y10S 901/01; Y10S 901/41; Y10T 408/03; Y10T 408/08; Y10T 408/20; Y10T 408/36; Y10T 408/368; Y10T 408/38; Y10T 408/3806; Y10T 408/56245; Y10T 408/93; Y10T 408/935
See application file for complete search history.

(56) References Cited

U.S. PATENT DOCUMENTS

| | | | |
|---|---|---|---|
| 4,611,377 A | 9/1986 | McCormick et al. | |
| 4,955,119 A | 9/1990 | Bonomi et al. | |
| 5,088,171 A * | 2/1992 | Suzuki | B23B 49/02 29/26 A |
| 5,281,079 A | 1/1994 | Lemelson | |
| 6,627,016 B2 | 9/2003 | Abare et al. | |
| 6,860,181 B2 | 3/2005 | Aubourg et al. | |
| 7,962,192 B2 | 6/2011 | Bodduluri et al. | |
| 8,187,535 B2 | 3/2012 | Londo et al. | |
| 8,225,496 B2 | 7/2012 | Bachrach et al. | |
| 8,753,346 B2 | 6/2014 | Suarez et al. | |
| 9,061,419 B2 | 6/2015 | Kranz et al. | |
| 9,488,449 B2 | 11/2016 | Opperman | |
| 2008/0060719 A1 | 3/2008 | Massaro | |
| 2008/0156117 A1 | 7/2008 | Londo et al. | |
| 2010/0217437 A1 | 8/2010 | Sarh et al. | |
| 2011/0245971 A1 | 10/2011 | Sarh et al. | |
| 2011/0296874 A1 | 12/2011 | Ghione et al. | |
| 2015/0336180 A1 | 11/2015 | Ramage et al. | |

FOREIGN PATENT DOCUMENTS

| | | | | |
|---|---|---|---|---|
| CN | 102844641 A | 12/2012 | | |
| CN | 103170658 A | 6/2013 | | |
| CN | 104093529 A | 10/2014 | | |
| DE | 19858791 A1 * | 6/1999 | ............ | B23B 39/16 |
| WO | 2014122400 A1 | 8/2014 | | |
| WO | 2014149265 A1 | 9/2014 | | |

* cited by examiner

… …

SYSTEM AND METHOD OF ROBOTIC POSITIONING OF MULTIPLE TOOLS

RELATED APPLICATIONS

The present application claims the benefit of U.S. Provisional Application No. 62/081,265 filed on Nov. 18, 2014 and entitled "System and Method of Robotic Positioning of Multiple Tools," the disclosure of which is hereby incorporated by reference in its entirety.

BACKGROUND

There are many applications in which multiple tools can be used on a work piece. The systems operating the tools should be configured to maximize the output of the tools. One context is the manufacturing of aircraft, such as jets and airplanes. Aircraft are complicated machines that include an enormous number of parts that need to be assembled with great precision.

The manufacturing process for aircraft includes drilling and/or processing holes, such as in the exterior body of the aircraft. Advance drilling equipment provides for automating and expediting the process. Advanced drilling equipment is advantageous over hand drilling because of increased quality control that is critical to the airline industry.

An existing problem with the use of advanced drilling equipment is the need for human operators to move and position the equipment. This positioning and moving often slows the process. Robotic devices have been used to move and position tools in the manufacturing process. However, these robotic devices are often expensive.

There is a need for systems and methods to use advanced drilling equipment in a more efficient and cost-effective manner.

SUMMARY

The present application is directed to methods and devices for simultaneously positioning and using multiple tools for operation on a work piece. One embodiment is directed to a method of simultaneously performing multiple operations on a work piece. The method includes engaging a first tool with a robotic device; moving the first tool with the robotic device to a position on the work piece; disengaging the tool from the robotic device; after disengagement, the first tool performing an operation on the work piece; while the first tool is operating on the work piece, moving the robotic device to a second tool; engaging the second tool with the robotic device; moving the second tool with the robotic device to a second position on the work piece; disengaging the second tool from the robotic device; and after disengagement, the second tool performing an operation on the work piece.

The method may also include both the first and second tool operating simultaneously on the work piece.

The method may also include returning the robotic device to the first tool and re-engaging the first tool after it has completed its operation and while the second tool is still in operation.

Another method includes positioning a plurality of tools on a work piece with a robotic device with each of the tools performing an operation on the work piece mechanically independently from the robotic device. The method includes thereafter determining which one of the tools to move, moving the robotic device to that tool, re-engaging that tool and moving the tool to a new position on the work piece, and disengaging the tool with the tool performing another operation at the new position after being disengaged.

Another embodiment is directed to a method of processing holes in a work piece. The method includes engaging a first drill with a robotic device with the first drill being positioned at an engagement position of the robotic device, moving the first drill with the robotic device to a first position on the work piece, disengaging the first drill from the robotic device at the first position. While the first drill is disengaged from the robotic device, drilling the work piece at the first position with the first drill. The method also includes that while the first drill is disengaged from the robotic device and drilling the work piece at the first position: moving the robotic device away from the first position while the engagement position is unoccupied; engaging a second drill with the robotic device with the second drill being positioned at the engagement position; moving the second drill with the robotic device to a second position on the work piece; disengaging the second drill from the robotic device at the second position; and while the second drill is disengaged from the robotic device, drilling the work piece with the second drill at the second position.

The method may also include that while each of the first and second drills are disengaged from the robotic device and drilling the work piece: moving the robotic device away from the second position while the engagement position is unoccupied; engaging a third drill with the robotic device with the third drill being positioned at the engagement position; moving the third drill with the robotic device to a third position on the work piece; disengaging the third drill from the robotic device at the third position; and drilling the work piece with the third drill at the third position.

The method may also include moving the robotic device to the first position on the work piece and re-engaging the first drill at the engagement position of the robotic device while the second and third drill are disengaged from the robotic device and drilling the work piece.

The method may also include receiving a signal from the first drill indicating that the drilling at the first position is complete prior to moving the robotic device to the first position.

The method may also include receiving a signal from the first drill indicating that the drilling at the first position is complete and re-engaging the first drill at the engagement position of the robotic device and moving the first drill to a docking station that is spaced away from the work piece.

The method may also include that engaging the second drill with the robotic device occurs at a docking station that is spaced away from the work piece.

The method may also include disengaging the second drill from the robotic device at the second position and moving the robotic device back to the first position while the first drill is still drilling the work piece at the first position.

The method may also include disengaging the first drill from the robotic device at the first position while the first drill is not drilling the work piece.

The method may also include determining a next position on the work piece for the first drill to drill the work piece while the first drill is disengaged from the robotic device and drilling the work piece at the first position.

The method may also include that while each of the first and second drills are drilling the work piece, moving the robotic device back to the one of the first and second drills based on determining which will complete the drilling soonest.

Another embodiment is directed to a system for performing manufacturing operations on a work piece. The system includes a robotic device with a movable arm and an engagement position on the arm, drills that each include a movable spindle configured to receive a drill bit, and a control circuit that monitors the manufacturing operations on the work piece. The robotic device is configured to receive instructions from the control circuit and responsive to the instructions to perform the following: engage a first one of the drills at the engagement position of the robotic device; move the first drill to a first position on the work piece; disengage from the first drill when the first drill is at the first position; move the first drill away from the first position while the engagement position is unoccupied and while the first drill is drilling the work piece at the first position; engage a second drill at the engagement position while the first drill is drilling the work piece; move the second drill to a second position on the work piece while the first drill is drilling the work piece; disengage the second drill from the robotic device at the second position while the first drill is drilling the work piece; and drill the work piece with the second drill at the second position while the first drill is drilling the work piece.

The system may also include a tool controller that controls the plurality of drills with the tool controller being spaced away from the control circuit.

The system may also include that the robotic device includes movable arms that move between an open position to disengage from the drills and a closed position to engage with the drills.

The system may include that each of the first and second drills are the same.

The system may include that robotic device includes a base that is located at a fixed position.

The various aspects of the various embodiments may be used alone or in any combination, as is desired.

DETAILED DESCRIPTION

The present application is directed to systems and methods for robotic positioning of multiple tools. The system includes one or more robotic devices, multiple tools, and one or more controllers. The one or more robotic devices are each configured to connect to the tools, move the tools to a desired work position, and release the tools at the work position. The tools are able to operate mechanically independently from the robotic devices to perform an operation at the position to which they are delivered. After releasing the tools, the robotic devices are able to perform other operations including moving additional tools to different work positions. The one or more controllers oversee the operation of the one or more robotic devices and tools and control the overall operation on a work piece.

Figure 1:
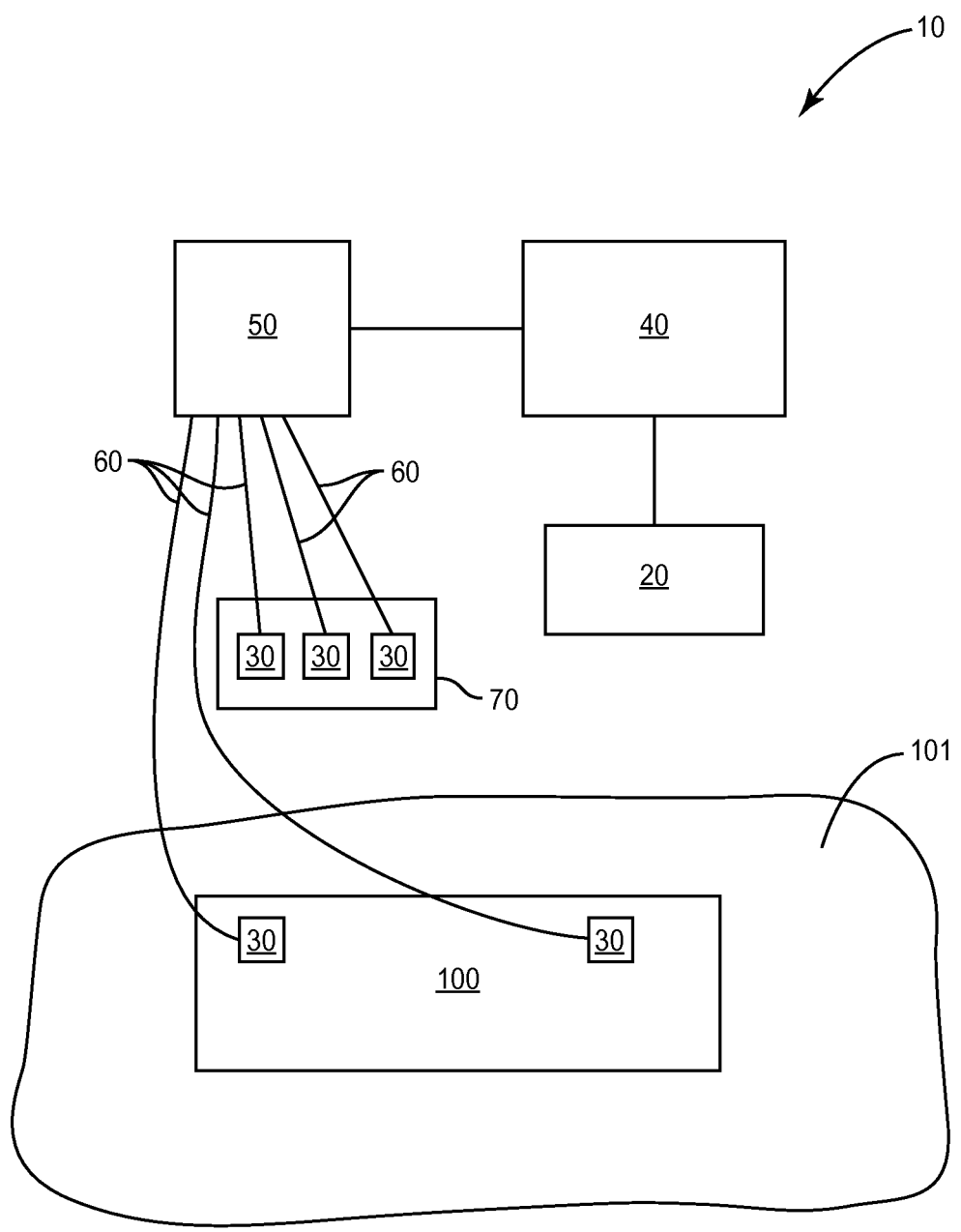
FIG. 1 is a schematic diagram of a robotic system for positioning multiple tools at a work piece.

FIG. 1 schematically illustrates a system 10 that includes a robotic device 20, multiple tools 30, a system controller 40, and a tool controller 50. FIG. 1 includes two of the tools 30 in operation on the work piece 100, and three additional tools 30 that are waiting to be positioned by the robotic device 20. The tools 30 are each designed to perform an operation on the work piece 100 that is positioned within a work area 101. The robotic device 20 initially engages with a first tool 30 and positions the tool 30 at the desired location on the work piece 100. Once positioned, the robotic device 20 releases the tool 30 at the desired location. The tool 30 operates mechanically independently from the robotic device 20 through communications with the tool controller 50 and performs the operation on the work piece 100. After releasing the first tool 30 and while the first tool 30 is operating on the work piece 100, the robotic device 20 engages with a second tool 30 and repeats the process. The robotic device 20 positions the second tool 30 at a second desired location on the work piece 100 and then releases the second tool 30. The second tool 30 performs an operation on the work piece 100 at the second location simultaneously with the first tool 30. The robotic device 20 may position any number of tools 30 for simultaneous operation.

The tool controller 50 controls the operation of the tools 30. The tool controller 50 may communicate directly with the tools 30 as illustrated in FIG. 1, or may communicate with the tools 30 through the system controller 40. The system controller 40 oversees the overall operation on the work piece 100. The system controller 40 communicates with the robotic device 20 providing commands regarding placement of the tools 30 on the work piece 100, and timing commands of when to move the tools 30. The communications between the various components may be wireless, hardwire via one or more cables 60, or a combination of hardwire and wireless communications.

The robotic device 20 initially delivers each tool 30 to a position on the work piece 100 to perform a first operation. The robotic device 20 subsequently returns to the tool 30 at some time after the tool 30 has finished its operation. The robotic device 20 then re-engages with the tool 30, moves the tool 30 to a new position on the work piece 100, and releases the tool 30. The tool 30 is then able to perform another operation at the new position. This process continues as the robotic device 20 continually moves and positions the tools 30 on the work piece 100. Thus, multiple tools 30 are operating simultaneously on the work piece 100 while being delivered to the various locations by the robotic device 20.

In another embodiment, the robotic device 20 may return a tool 30 to a docking station 70 and engage with a different tool 30. The robotic device 20 then moves the new tool to the work area 101 for work on the work piece 100. The docking station 70 may be located at a fixed location, or may be movable with a movable robotic device 20. To provide the movement, the docking station 70 may be positioned on a rail or travel via an automated guided vehicle (AGV)-type system. The docking station 70 provides for positioning the tools 30 when not in use. In one embodiment, the docking station 70 is a table.

In various embodiments, the robotic device 20 simultaneously uses multiple tools 20. The tools 20 may be the same or different. The robotic device 20 may repeatedly use the same tools 20 active on the work piece 100, or may move the tools to an inactive area (e.g., the docking station) and replace them with different tools 20.

The system 10 is configured for multiple tools 30 to act in concert while operating on the work piece 100. The tools 30 are each delivered by the robotic device 20 but otherwise work independently from a mechanical perspective from the robotic device 20. Communications to and from the tools 30 and power to the tools 30 while they are operating on the work piece 100 are supplied by means other than the robotic device 20.

Figure 2:
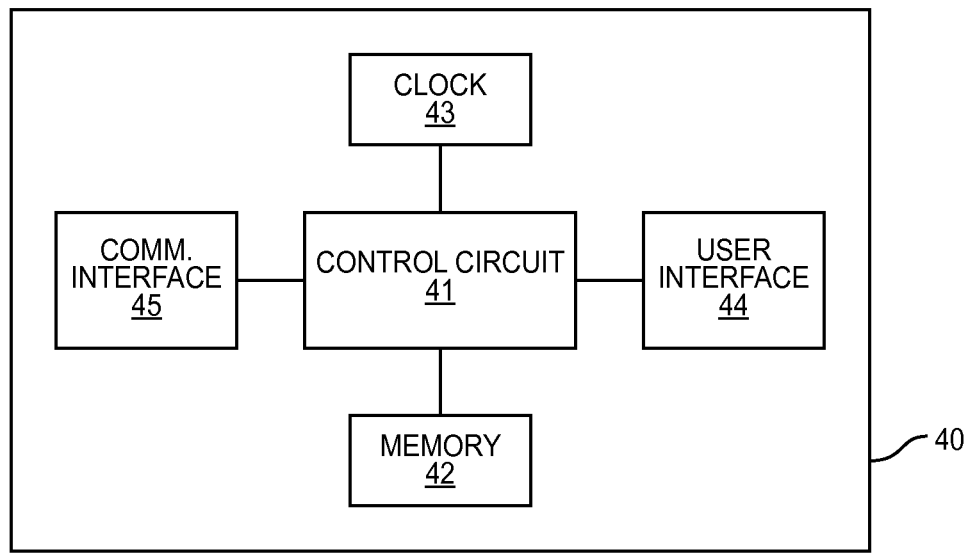
FIG. 2 is a schematic diagram of a system controller.

The system controller 40 controls the overall operation of the system 10. The system controller 40 is typically housed in a cabinet or the like at some distance from the robotic device 20. Other embodiments may include the system controller 40 being in the same location as a robot controller. As illustrated in FIG. 2, the system controller 40 may include a control circuit 41 with one or more processors and/or microcontrollers that controls the overall operation according to program instructions stored in memory 42. Various types of memory 42 may be included for storing program instructions and data needed for operation, and other memory for storing temporary data required to carry out its operations. A clock 43 either as a separate component or incorporated with the control circuit 41 provides timing data. The system controller 40 may also include a user interface 44 that may include one or more user input devices such as a keypad, touchpad, function keys, scroll wheel, or other type of computer input device. A display may also be included, such as a conventional liquid crystal display (LCD) or touch screen display which also functions as a user input device. The system controller 40 also includes a communication interface 45 for wireless and/or hardwire communications with one or more of the other system components.

Figure 3:
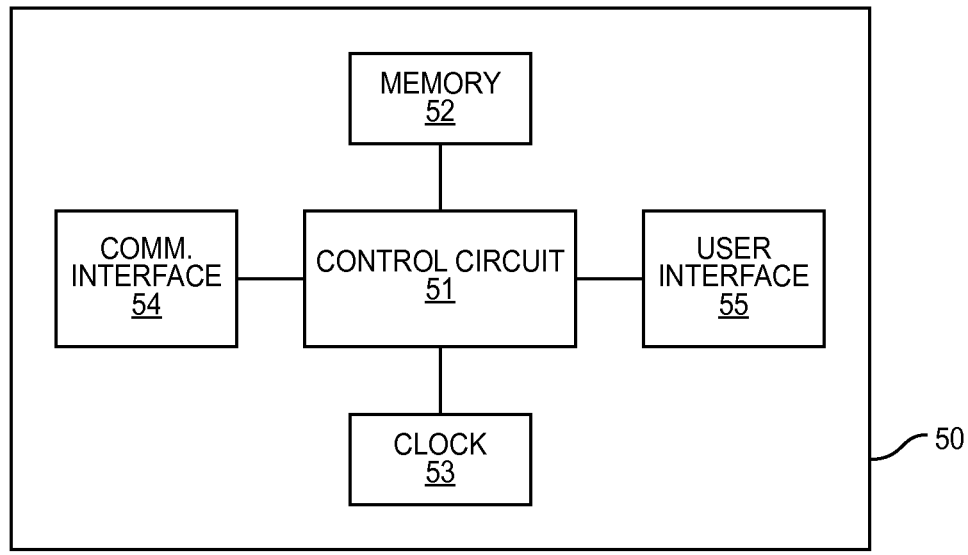
FIG. 3 is a schematic diagram of a tool controller.

The tool controller 50 controls and monitors the operations of the tools 30. As illustrated in FIG. 3, the tool controller 50 may include a control circuit 51 and associated memory 52 to act through program instructions to control the tools 30. Tool controller 50 may further include a clock 53, and a user interface 55 to receive input from a user regarding operation of one or more of the tools 30. A communication interface 54 provides for communication with one or more of the other components in the system 10. These elements of the tool controller 50 may be substantially the same as those described above for the system controller 40. In one embodiment as illustrated in FIG. 1, the tool controller 50 is a separate component that is in communication with the system controller 40. Other embodiments may include a single controller that includes the functionality of both the system controller 40 and the tool controller 50.

The robotic device 20 engages with and delivers the tools 30 to the various positions to perform operations on the work piece 100. The robotic device 20 is typically located proximate the work area 101, such as along an assembly line for performing operations on the various work pieces 100. The robotic device 20 may be stationary relative to the work area such that the work pieces 100 move to the robotic device 20, such as along an assembly line. Other embodiments include the robotic device 20 being movable about the work area 101. The robotic device 20 is further configured to move the tools 30 away from the work area 101 and position the tools 30 in a storage area.

Figure 4:
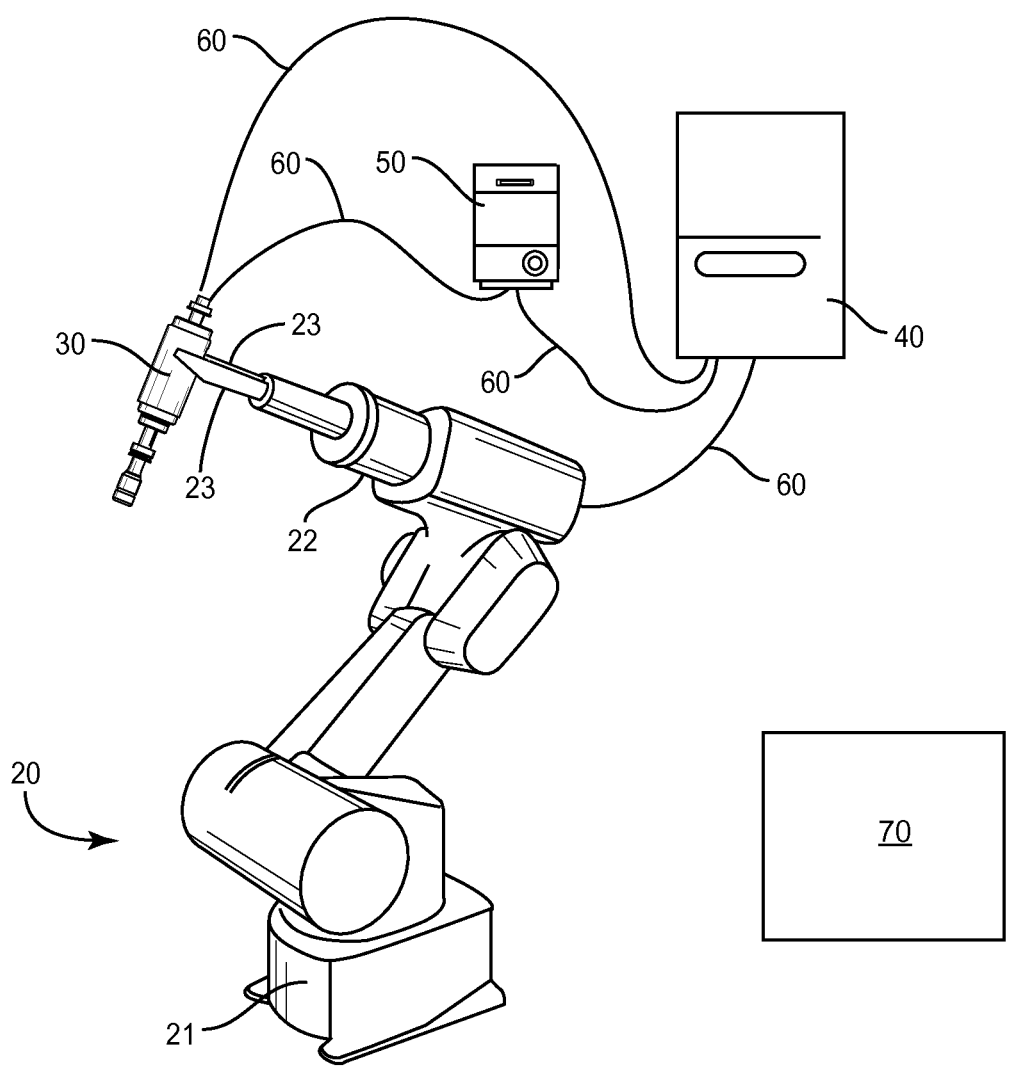
FIG. 4 is a diagram of a robotic device engaged with a tool and receiving direction from a tool controller.

FIG. 4 illustrates one embodiment of a robotic device 20 engaged with a tool 30. The robotic device 20 includes a base 21 with a movable arm 22. Opposing fingers 23 at the end of the arm 22 are configured to engage with the tool 30. The base 21 may be fixed in position with the arm 22 being pivotally mounted on the base 21. The arm 22 may be pivotal about the base 21, as well as include various different sections that provide for a variety of different movements including various vertical, horizontal, and rotational movements. Alternatively, the base 21 may include mounts that engage with rails, wheels, etc. to be movable relative to the work area 101. FIG. 4 illustrates on particular type of robotic device 20, with the system 10 configured to operate with a variety of different robotic devices 20.

The robotic device 20 may be configured to center itself on the tool 30 prior to engagement. This may be accomplished by one or more proximity sensors, or may include a mechanical means such as an engagement member such as a handle on the tool 30 that provides for a single manner of engagement. The self-centering may also be accomplished by force feedback detected by the robotic device 20 during the engagement.

The robotic device 20 is configured to operate according to commands received from the system controller 40. To operate according to the commands, the robotic device 20 may include some processing capability and include a control circuit and associated memory to operate according to stored program instructions based on the received commands.

In one embodiment, communications between the system controller 40, tool controller 50, robotic device 20, and the tools 30 occur through a cabling system with various cables 60 extending between the components. The cables 60 are configured for carrying various data signals. The system 10 may communicate through a LAN. In one embodiment, communications occur through a communications bus. The communication between the components may also be wireless, such as through a Bluetooth interface or wireless local area network (WLAN) interface. Some embodiments feature a combination of cabling and wireless communications.

A variety of different tools 30 may be used in the system 10. Examples include but are not limited to automated drilling equipment, screw spindles (or more generically tightening spindles) to tighten screws and nuts, welders, and others. The tools 30 are configured to be powered, communicate, and operate independently from the robotic device 20. Each of the tools 30 being used in the system 10 may be the same (e.g., each tool is a drill), or one or more of the tools 30 may be different (e.g., two drills, three spindles, one welder).

Figure 5:
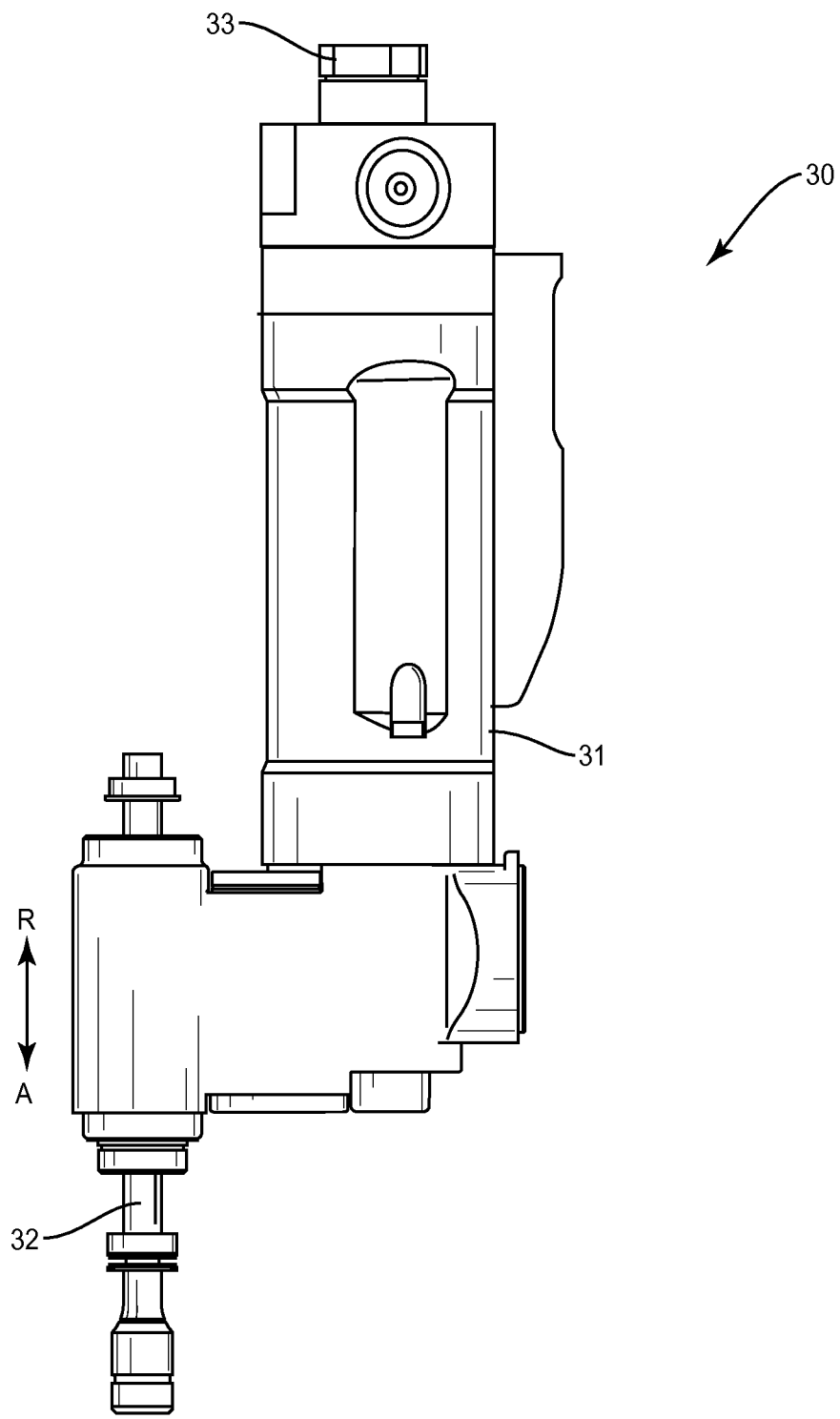
FIG. 5 is a side view of a tool.

In one embodiment, the tools 30 are positive feed drills used for forming a hole in the work piece 100. FIG. 5 illustrates one embodiment of the tool 30 that includes an exterior housing 31 that extends around and forms the shape of the tool 30. The tool 30 also includes a movable spindle 32 configured to receive a drill bit (not illustrated). The spindle 32 is able to move in an advance (A) direction for the drill bit to form the hole, and in an opposing retract (R) direction to move the drill bit out of the work piece 100. A connection interface 33 provides for connections for power and/or data communication. The tool 30 may be electrically or pneumatically powered which is supplied by outside sources that are provided through the cabling system that connects to the tool 30 at the connection 33. In another embodiment, the tools 30 are powered by an interior power source (e.g., battery) and hence do not include a power connection. The connection 33 may also provide for communications to and from the system controller 40 and/or the tool controller 50. The tool 30 may also include a wireless communication interface instead of or in combination with the connection 33.

Figure 6:
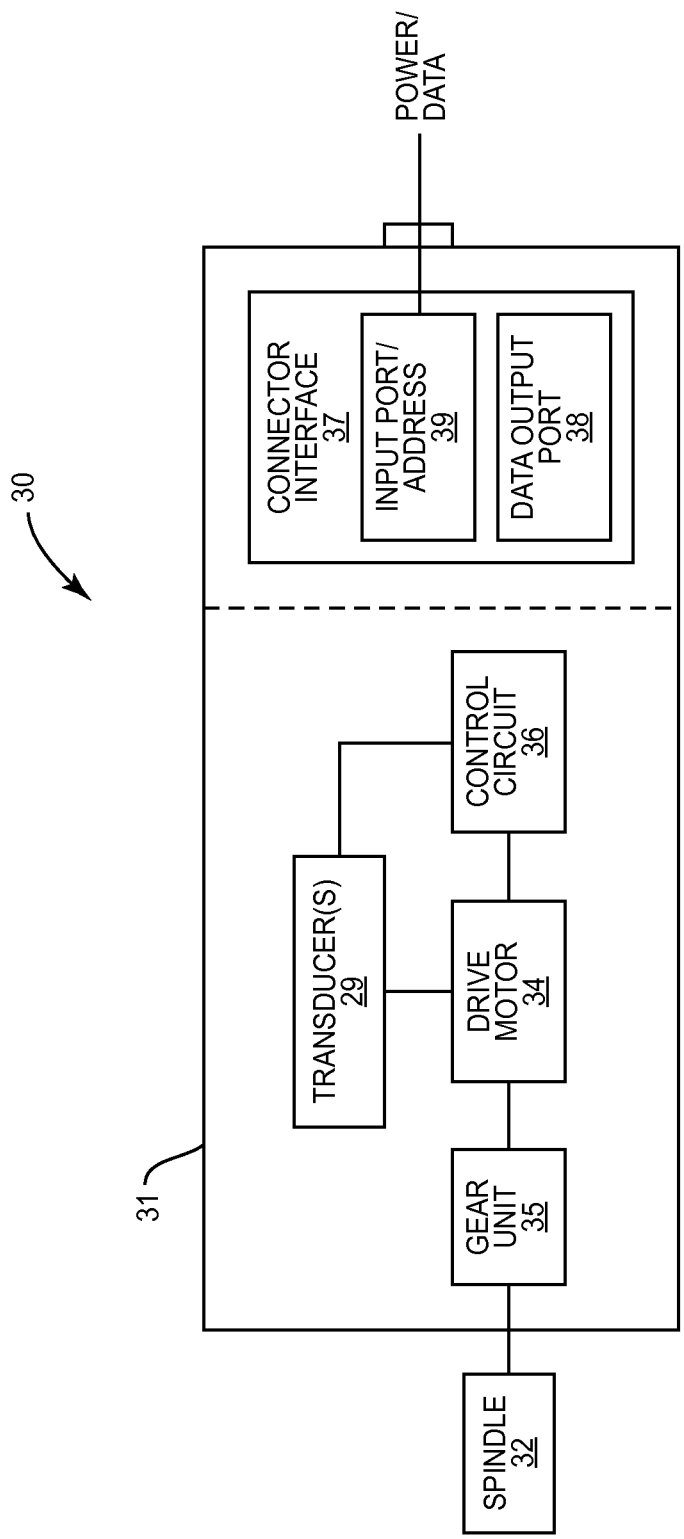
FIG. 6 is a schematic diagram of a tool.

One embodiment of the components of an electrically-powered tool 30 is illustrated in FIG. 6. The tool 30 includes the exterior housing 31 and the spindle 32. The housing 31 houses a drive motor 34, a gear unit 35, and a processing circuit 36. The processing circuit 36 may include one or more processors and/or microcontrollers and associated memory that controls the overall operation according to stored program instructions. Various types of memory may be included for storing program instructions and data needed for operation, and other memory for storing temporary data required to carry out its operations. The drive motor 34 is electrically powered and produces rotational force in a conventional fashion. The drive motor 34 may also include an associated servo amplifier (not illustrated) to aid in control. The gear unit 35 couples the rotational force from the drive motor 34 to the spindle 32.

One or more transducers 29 are operative to monitor the drive motor 34, the gear unit 35, and/or the spindle 32. The processing circuit 36 receives measurement data from the transducer(s) 29 and processes the data and then supplies some or all of the processed data to an interface 37 with other upstream electronics, specifically an output data port 38. The tool 30 may also include an address device 39, for example in the form of rotary switches to allow the tool 30 to recognize signals from the system controller 40 or tool controller 50 that are intended for it, and vice versa. This address device 39 may form part of the interface 37. The connector interface 37 may conceptually include one or more input ports and one or more output ports. At least one of the output ports functions as the output data port 38 that receives processed data from the processing circuit 36. The connector interface 37 is further configured to engage with and receive power and data capability through the cabling system. The connector interface 37 may also be configured for wireless communications with one or more of the other components.

The tools 30 may be further configured to lock to the work piece 100 or a locking plate on the work piece 100. This may occur while still engaged with the robotic device 20, or after being disengaged from the robotic device. This secures the tool at the proper position. The locking of the tools 30 may also include a twist-lock connection. The robotic device 20 rotates the tool 30 after it has been located thus providing for locking of the tool 30 to the work piece 100 (or associated work plate). In another embodiment, the tool 30 includes a collet that is actuated after the tool 30 is located to trigger a concentric-collet connection thus locking the tool 30.

A docking station 70 (see FIG. 4) may be located in the vicinity of the robotic device 20 and work area 101 for storing the tools 30 when detached from the robotic device 20. The docking station 70 may include a stand or other like structure for placement of the tools 30 to safely position the tools 30 in preparation for reattachment and use with the robotic device 20.

Figure 7:
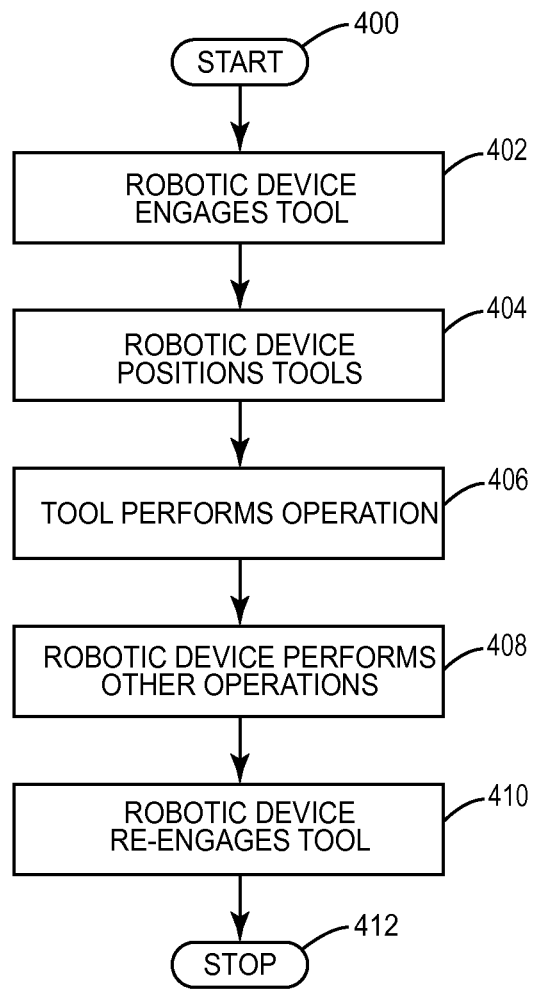
FIG. 7 is a flow chart diagram of a process of moving multiple tools by a robotic device.

FIG. 7 illustrates an embodiment of an overall process performed by the system 10. The process starts (block 400) with the robotic device 20 engaging with the tool 30 (block 402). This may include the robotic device 20 initially moving to a pre-programmed position. This position is either programmed within memory in the robotic device 20 or may be a result of commands received from the system controller 40. The system 10 may also include a vision system that monitors the location of the various components and provides for a secondary feedback to the system controller 40 to increase the accuracy. The vision system may be programmed to recognize one or more features, such as a jig, template, tool 30, robotic device 20, or other structure. Another positioning system includes a GPS-style system that validates the position of the tool 30 relative to the work piece 100. Once the system controller 40 receives the various location data it can determine that the robotic device 20 is in the correct position and signal for the robotic device 20 to engage with the tool 30.

The robotic device 20 delivers the tool 30 to the new position (block 404). This may include the robotic device 20 moving to a pre-programmed position. Further, the position may be verified by the vision system. The system controller 40 processes this data to confirm the correct position. One of more of the tool controller 50 and the system controller 40 may signal the tool 20 to lock onto the work piece 100 (or associated tooling plate). Once the tool 30 is locked in position, it sends a signal to the tool controller 50 and/or system controller 40. Once received, the system controller 40 signals the robotic device 20 to dis-engage the tool 30.

Once the tool 30 is locked into the proper position, the tool controller 50 signals the tool 30 to start the operation. The operation of the tool 30 may then be performed using the logic stored in the tool 30 through the control circuit 36 (FIG. 6). Alternatively or in addition, one or more parameters may be controlled by the tool controller 50. Once the tool 30 is complete, the tool 30 transmits a signal to the tool controller 50. In one embodiment, the operation includes a drilling cycle that includes a drilling/reaming/countersinking cycle.

While the tool 30 is in operation, the robotic device 20 performs other operations (block 408). This may include delivering other tools 30 to other positions, or doing various other tasks.

After the tool controller 50 has received the complete signal from the tool 30, the tool re-engages the tool 30 (block 410). This includes the system controller 40 signaling the robotic device 20 to return to the tool 30. In response, the robotic device 20 moves to the last known position of the tool 30 that is recorded when the tool 30 was previously delivered. Further, the vision system may provide additional positioning feedback regarding the location. Once the robotic device 20 is in the proper position, the robotic device 20 re-engages with the tool 30 and sends a signal to the system controller 40. The tool controller 50 signals the tool 30 to unlock from the work piece 100 (or the tooling plate). Alternatively, the robotic device 20 may unlock the tool 30 from the work piece 100 or tooling plate. This may include the robotic device 20 twisting or otherwise releasing the tool 30. The robotic device 20 may also trigger a concentric-collet connection once the tool 30 is positioned on the work piece 100 by actuating a collet on the tool 30. The robotic device 20 is then able to move the tool 30 to the next position on the work piece 100.

One specific embodiment is directed to a system using advanced drilling tool, such as from the Advanced Drilling Equipment available from Apex Tool Group, of Sparks, Md., United States. These tools 30 may be used to operate on airplanes. The process includes the basic steps that include: the robotic device 20 engaging the drilling equipment 30; the robotic device 20 positioning the drilling tool 30; the actions of the drilling equipment 30 in forming a hole in the work piece 100 concurrently with the robotic device 20 performing other tasks; and the robotic device 20 re-engaging the drilling equipment 30 after the drilling cycle is complete.

The step of the robotic device 20 engaging the drilling equipment includes the robotic device 20 moving to a pre-programmed position. The system may include a secondary position feedback to verify that the robotic device 20 is in the correct position. This secondary position feedback may be from a variety of different positioning devices, including but not limited to one or more visionary systems that detect the position of the robotic device 20, one or more proximity sensors, or one or more sensors on the robotic device or mounted at the work area 101. Once the position of the robotic device 20 is confirmed to be correct, the robotic device 20 engages and moves the drilling tool 30.

The step of the robotic device 20 positioning the drilling equipment 30 includes the robotic device 20 moving the drilling tool 30 to a pre-programmed position. Secondary positioning feedback may be provided to the system to further ensure the tool 30 is at the correct position. At this position, the tool 30 locks onto the work piece 100 or tooling plate on the work piece 100. The tool 30 then sends a signal to one or more of the system controller 40, tool controller 50, and the robotic device 20 that it is properly locked at the position. This signal causes the robotic device 20 to release the tool 30.

Once released, the tool 30 performs one or more operations on the work piece 100. This may include the tool 30 drilling a hole in the work piece 100 and/or reaming/countersinking a hole. Once in position, the tool 30 may receive a signal to start the drilling process. Once complete, the tool 30 sends a cycle complete signal. While the tool 30 is in operation, the robotic device 20 performs other functions. This may include but is not limited to engaging and positioning another drilling tool 30, fastening a drilling tool 30, and performing measurements of the work piece 100.

The step of the robotic device 20 re-engaging the drilling equipment 30 after the drilling cycle is complete includes the robotic device 20 receiving a signal to re-engage the tool 30. Once the signal is received, the robotic device 20 moves to the last known position saved for the tool 30. Once the robotic device 20 has moved to this position, the location may be confirmed by the secondary positioning system. The robotic device 20 then re-engages the tool, unlocks the tool 30 from the work piece 100 and/or tooling plate, and sends a signal to this effect. The robotic device 20 then moves the tool 30 from this position.

Figure 8:
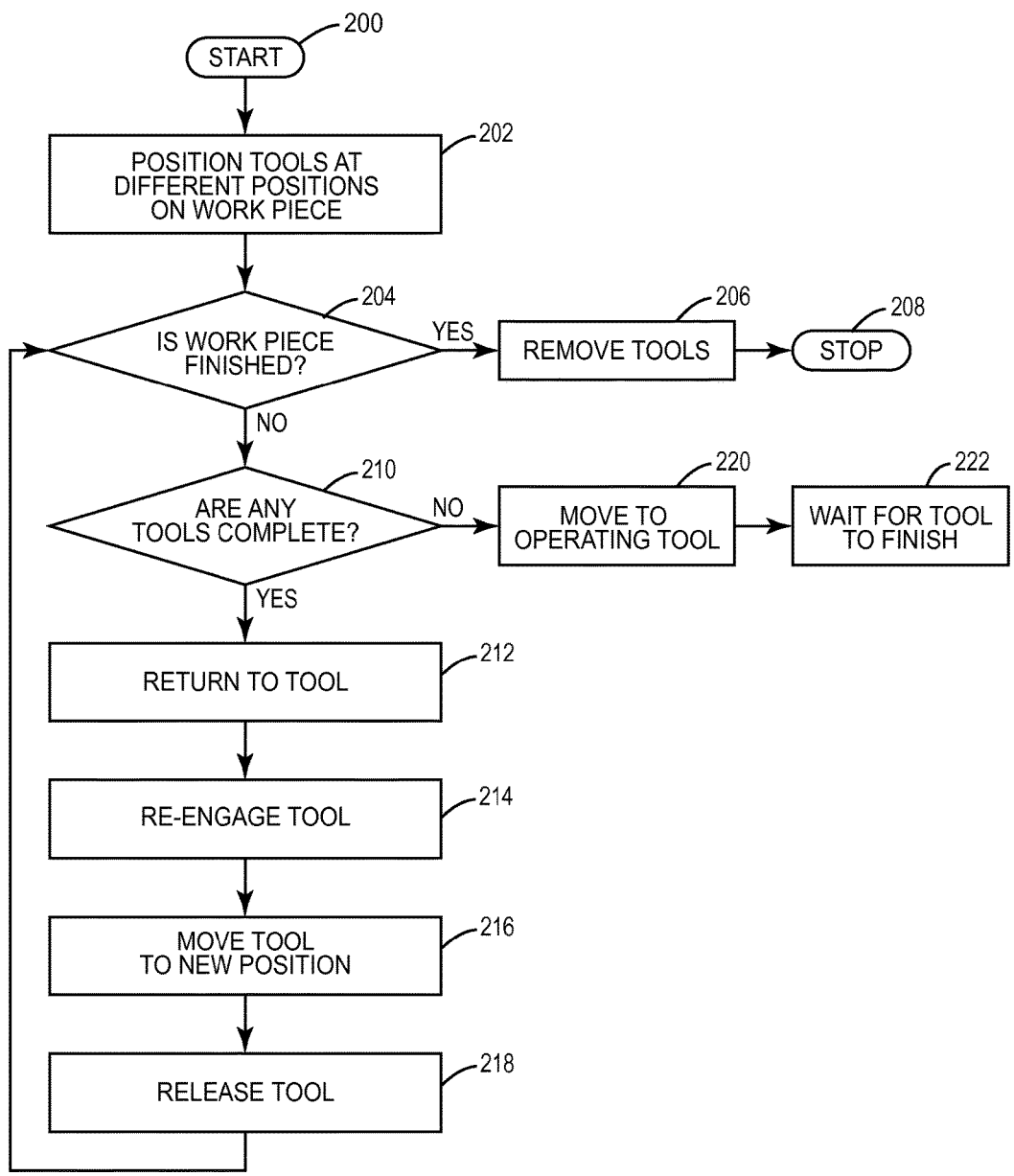
FIG. 8 is a flow chart diagram of operational steps of a robotic device during an operation.

FIG. 8 illustrates a method of the robotic device 20 during the operation. The process starts (block 200) with the robotic device 20 moving to a pre-programmed position. The robotic device 20 engages with, moves, positions, and releases multiple different tools 30 each at a different location on the work piece 100 (block 202). Each of the tools 30 is configured to perform a specific task on the work piece 100 at the delivered position. Further, each of the tools 30 is configured to operate independently from the robotic device 20 such that their operation can occur after being released by the robotic device 20 at the particular location on the work piece 100.

In some embodiments, the tools 30 do not start the operation until being released from the robotic device 20. Other embodiments include the tools 30 starting operation on the work piece 100 while still being engaged with the robotic device 20.

Each of the tools 30 is in operation after release from the robotic device 20. The tools 30 are configured to operate independently from a mechanical perspective from the robotic device 20. This may include that operating control is provided through one or both of the system and tool controllers 40, 50. In one embodiment with drilling tools 30, the tools 30 may adjust the speed and/or feed of the drill using tool logic and while not be connected to the robotic device 20. The drill tools can also stop both the drilling process and feed of coolant without control from the robotic device 20.

The tools 30 may communicate to the robotic device 20 through one or more of the tool controller 50 and the system controller 40. The tools 30 may also communicate directly with the robotic device 20.

In this manner, the robotic device 20 places and releases the first tool 30 on the work piece 100. While the first tool 30 is in operation, the robotic device 20 moves to and engages with a second tool 30. The robotic device 20 moves the second tool 30 to the desired location and releases. At this time, both the first and second tools 30 are simultaneously performing operations on the work piece 100. The system 10 may include any number of tools 30 simultaneously performing operations on the work piece 100.

After placing the tools 30 on the work piece 100, the robotic device 20 is instructed from the system controller 40 whether the work piece 100 is complete (block 204). If complete, the robotic device 20 may return to each tool 30 and move each of the tools 30 from the work piece 100 (block 206). The robotic device 20 may move them to a particular location, such as a docking station 70. Once the tools 30 are removed the process is complete (block 208).

If the process is not complete (block 204), the robotic device 20 is instructed from the system controller 40 if any of the tools 30 have completed their operation (block 210). If a tool 30 is complete, the robotic device 20 returns to the location of the tool 30 (block 212). The robotic device 20 then re-engages with the tool (block 214), moves the tool 30 to the next location on the work piece 100 as instructed by the system controller 40 (block 216), and releases the tool (block 218) thus allowing for the tool 30 to perform another operation at this new location.

If at block 210 no tools 30 have completed their operation (i.e., each tool is still in operation at their particular location), the robotic device 20 receives instructions from the system controller 40 regarding which tool 30 to travel to (block 220). When the robotic device 20 arrives at the still-operating tool 30, the robotic device 20 may or may not re-engage while the tool 30 is still in operation. In either event, once the tool 30 finishes the current operation (block 222), the robotic device 20 moves the tool 30 to the new position as previously disclosed.

Figure 9:
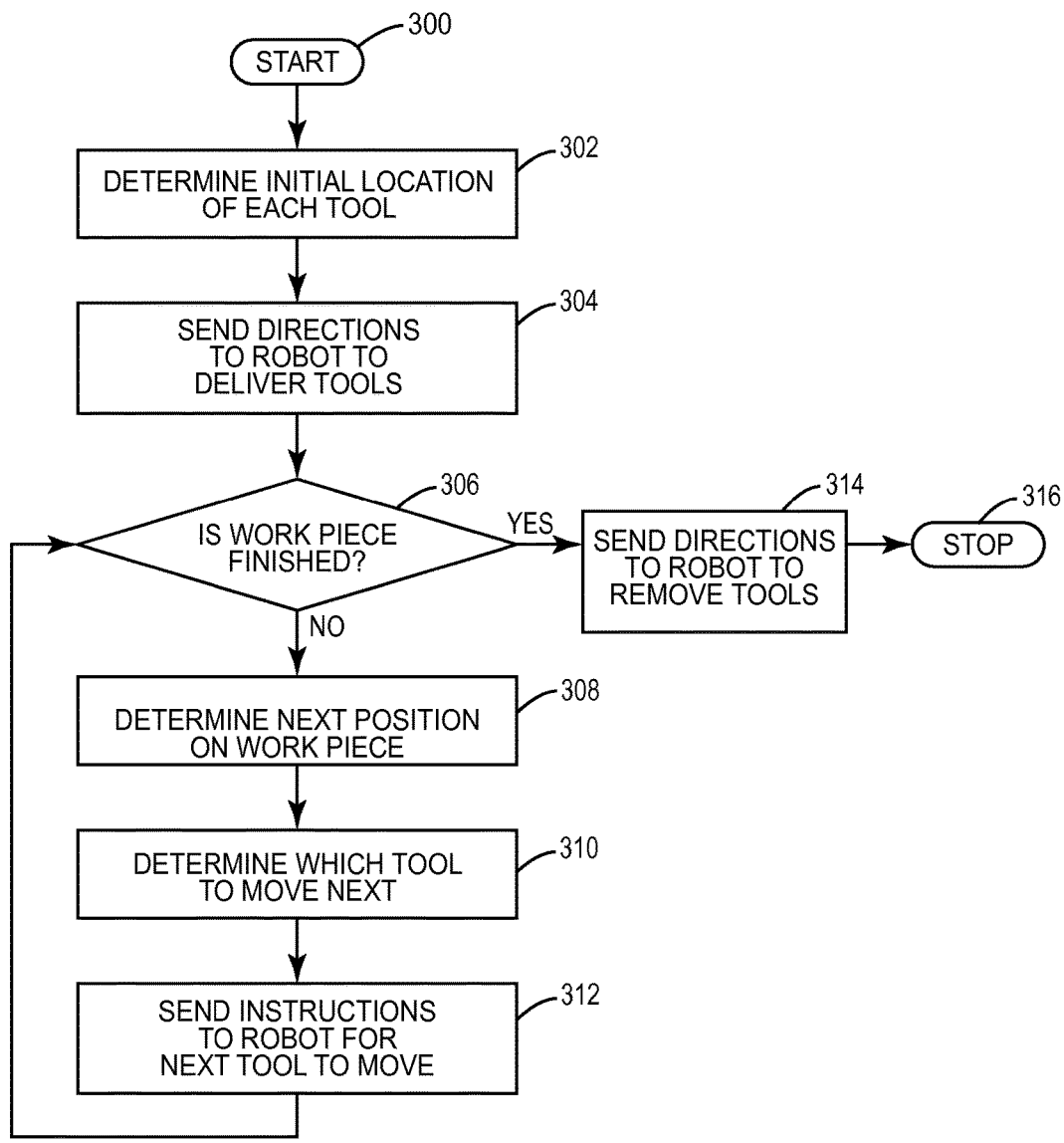
FIG. 9 is a flow chart diagram of operational steps of a system controller during an operation.

FIG. 9 illustrates a method performing by the system controller 40 during operations on the work piece 100. The process starts (block 300) with the system controller 40 determining the initial locations for each of the tools 30 (block 302). This determination may be based on program instructions stored in memory 42 and/or commands received through a user interface 44. The system controller 40 instructs the robotic device 20 to position the tools 30 at each of the initial positions (block 304).

These instructions provide for sequential movement of the robotic device 20 to position the tools 30 in the determined order. The sequence may provide for maximizing the efficiency of the overall operation on the work piece 100. In one embodiment, the order of operation may minimize the overall movement of the robotic device 20. Another embodiment may include the sequence being determined by accessible locations on the work piece 100.

Figure 10:
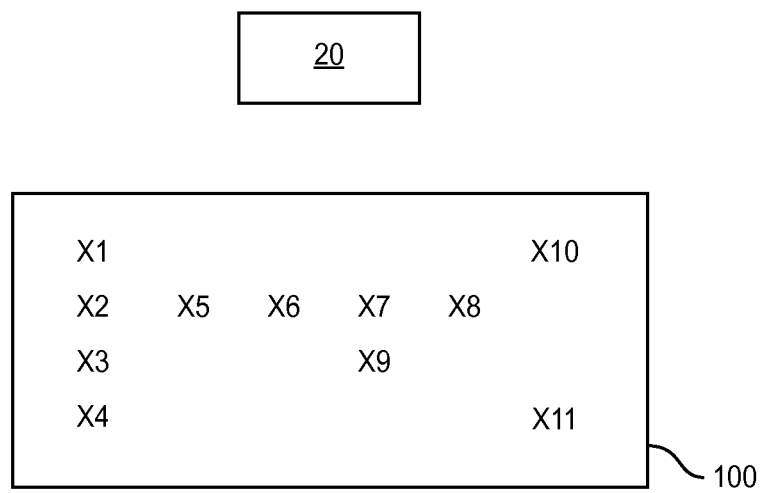
FIG. 10 is a schematic diagram of operation locations spaced about a work piece.

FIG. 10 provides an embodiment of a work piece 100 with each of eleven operation locations indicated with an "X".

The system controller 40 may be programmed with each of the work locations prior to the start of the operation, or the system controller 40 may calculate one or more of the subsequent work locations after the start of the operation. In one embodiment, the controller 40 may determine the order of operations to minimize the travel of the robotic device 20. This may include initially moving tools 30 to the closest locations (i.e., locations 1 and 10). The controller 40 may then move the next closest locations (i.e., locations 2, 5, 6, 7, and 8). The remainder of the locations may be machined in a similar sequence.

In another embodiment, the controller 40 sets the sequence to minimize an overall time necessary to complete the operation on the work piece 100. This may include starting operations at the locations that take the greatest amount of time, and subsequently moving the tools 30 to locations that can be completed in less time.

The controller 40 may also determine the sequence based on accessible locations on the work piece 100. By way of example, locations 5, 6, 7, and 8 are between location 9 and the starting point for the robotic device 20. Therefore, the operation at location 9 is performed prior to or after locations 5, 6, 7, and 8. Otherwise, one or more operating tools at locations 5, 6, 7, or 8 may block the robotic device 20 from moving a tool to location 9. Likewise, a tool 30 operating at location 3 may block access to location 4. Therefore, these two locations may need to be completed at different times (i.e., tools cannot simultaneously operate at both locations 3 and 4).

Another factor in determining the sequence is the location of cables 60 that provide data and/or power to the tools 30. These cables 60 may extend across portions of the work piece 100 thus making certain locations inaccessible at certain times. In one embodiment, robotic device 20 includes one or more sensors configured to sense the proximity of a cable 60 and prevent contact with the cable 60. Controller 40 may be configured to receive input from the sensor(s) and direct the robotic device 20 accordingly.

The system controller 40 may also include a collision avoidance programming. This programming models the location of the one or more robotic devices 20, tools 30 and associated cabling to prevent collisions from occurring during movement of the robotic devices 20.

To reduce or eliminate robotic device 20 movement due to the cables 60, the system 10 may include a reel that extends and retracts the cables 60 as the tool 30 is moved to the various positions about the work piece 100 and storage positions. The reel may be mounted overhead from the tool 30 and/or work area 101 to further minimize the issues. In another embodiment, a rigid extension of the cable 60 extends vertically from the tool 30 and enables the cable 60 to be routed above the work area allowing the robotic device 20 to move without interference. The horizontal portion of the cable 60 above the rigid section may be managed by festooning, movable cable track, or other mechanisms.

Returning to the flowchart of FIG. 9, after the tools 30 are initially placed at the various positions on the work piece 100, controller 40 determines if there are additional positions or whether the work piece 100 is finished (block 306). If the work piece 100 is not finished, controller 40 determines the next position at which to perform an operation (block 308) and which tool 30 to move to that position (block 310). This data may be predetermined, or calculated during the course of the operation on the work piece 100. The controller 40 signals the data to the robotic device 20 which acts as disclosed above in the logic of FIGS. 7 and 8 to move the tools 30 in the commanded order. When the controller 40 determines that the work piece 100 is finished (block 306), the controller 40 sends commands to the robotic device 20 to remove the tools 30 from the work piece 100 (block 314) and the operation ceases (block 316).

Figure 11:
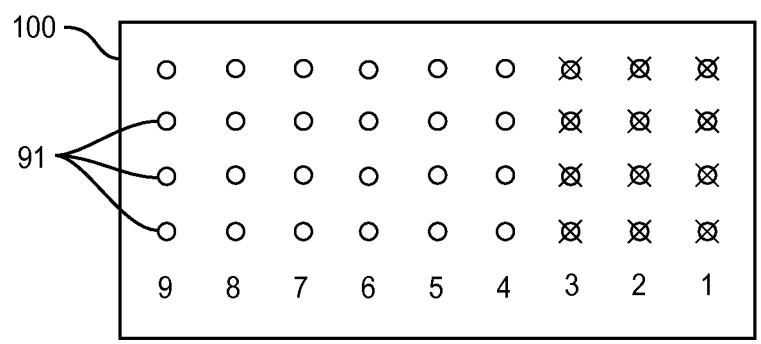
FIG. 11 is a schematic diagram of operation locations and sequencing of work operations about a work piece.

The FIG. 11 illustrates a schematic representation of a work piece 100 illustrating an order of performance of the various machining operations. The work piece 100 includes a number of holes 91 illustrated by circles. The tools 30 that are controlled by the robotic device 20 perform one or more processing steps on the holes 91. Processed holes that are completed are schematically illustrated in FIG. 12 with a circle having an "x".

The process is controlled through a supervisory control algorithm at the system controller 40. This process includes communications from the tools 30 indicating that a tool cycle is complete or if there is some type of error. The robotic device 20 will move the tools as necessary in view of these communications. The control algorithm calculates the optimal sequence for positioning the tools in the locations on the work piece 100. One process includes processing the work piece 100 from one side to the other (e.g., left-to-right). This includes each of the holes in each row being completed and shifting the tools 30 to the next row along the length. For example, the tools 30 are positioned to complete row 1, followed by row 2, row 3, etc. Another process may include performing operations along rows that are spread out on the work piece 100. For example, rows 1, 4, and 7 may be initially completed, followed by a second step of rows 2, 5, and 8. The final step may then complete rows 3, 6, and 9. A cost function defined by the overall cycle time of the system 10 can be optimized to determine the most efficient location of a tool 30 to be placed after completing its previous cycle.

The tools 30 may be configured to perform a variety of different tasks on the work piece 100. In one embodiment, the work piece 100 includes holes and the tools 30 perform one or more processing operations on the holes. The holes may be formed by the tools 30, may be formed by other tools that are moved by the robotic device 20, or may be pre-formed prior to the interaction with the robotic device 20.

Figure 12:
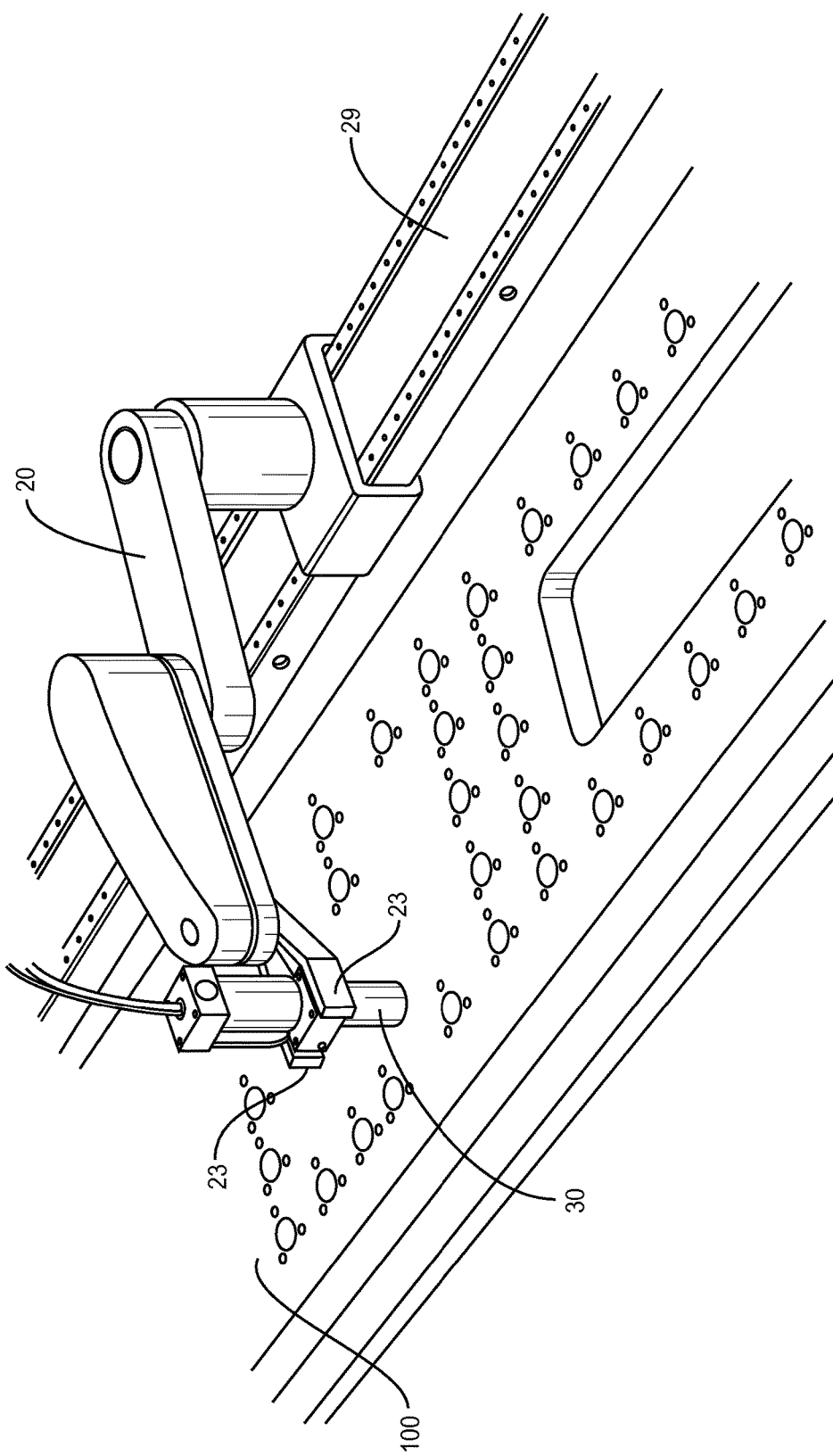
FIG. 12 is a perspective view of a robotic device positioning a tool relative to a work piece.
Figure 13:
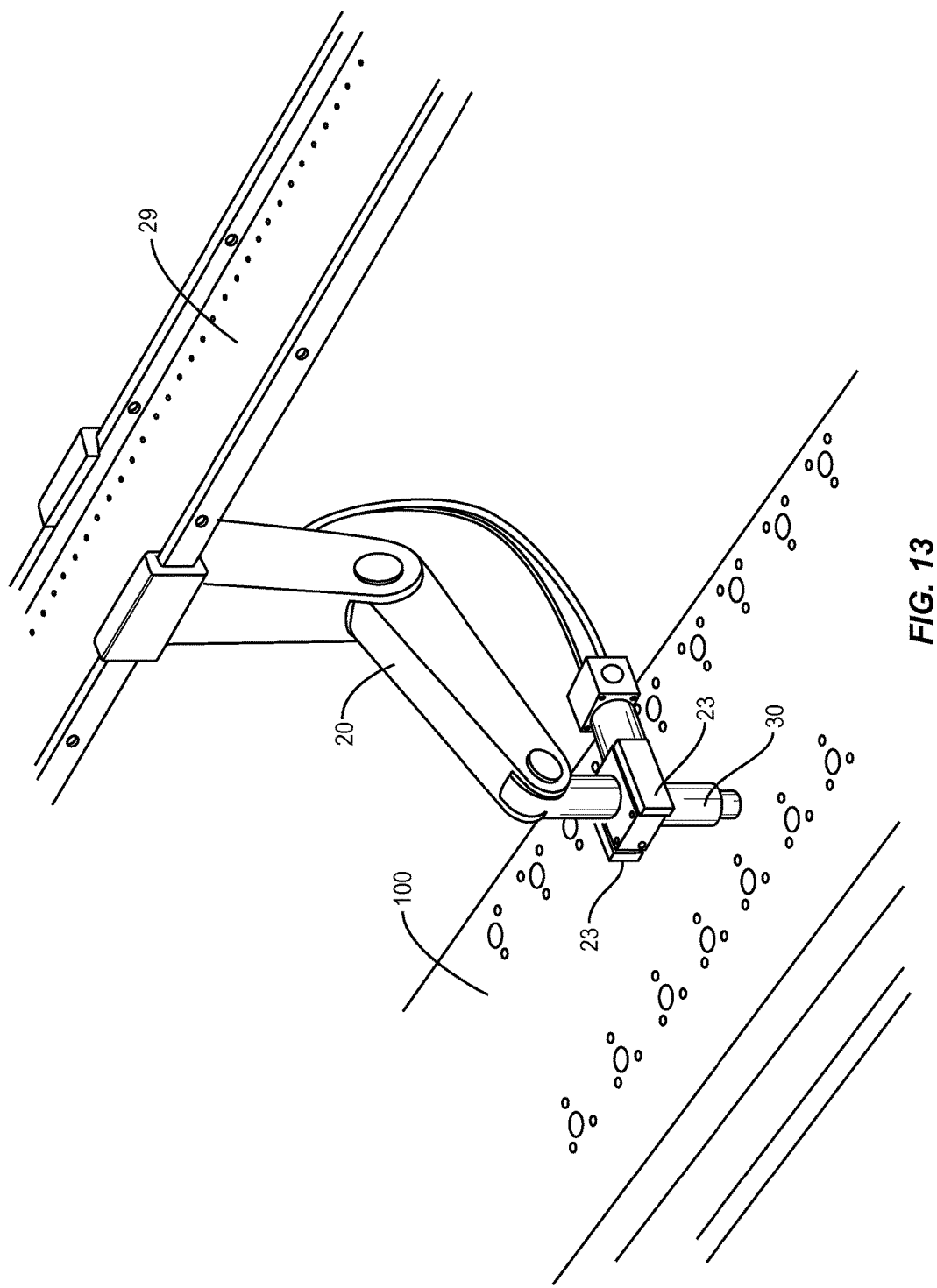
FIG. 13 is a perspective view of a robotic device positioning a tool relative to a work piece.
Figure 14:
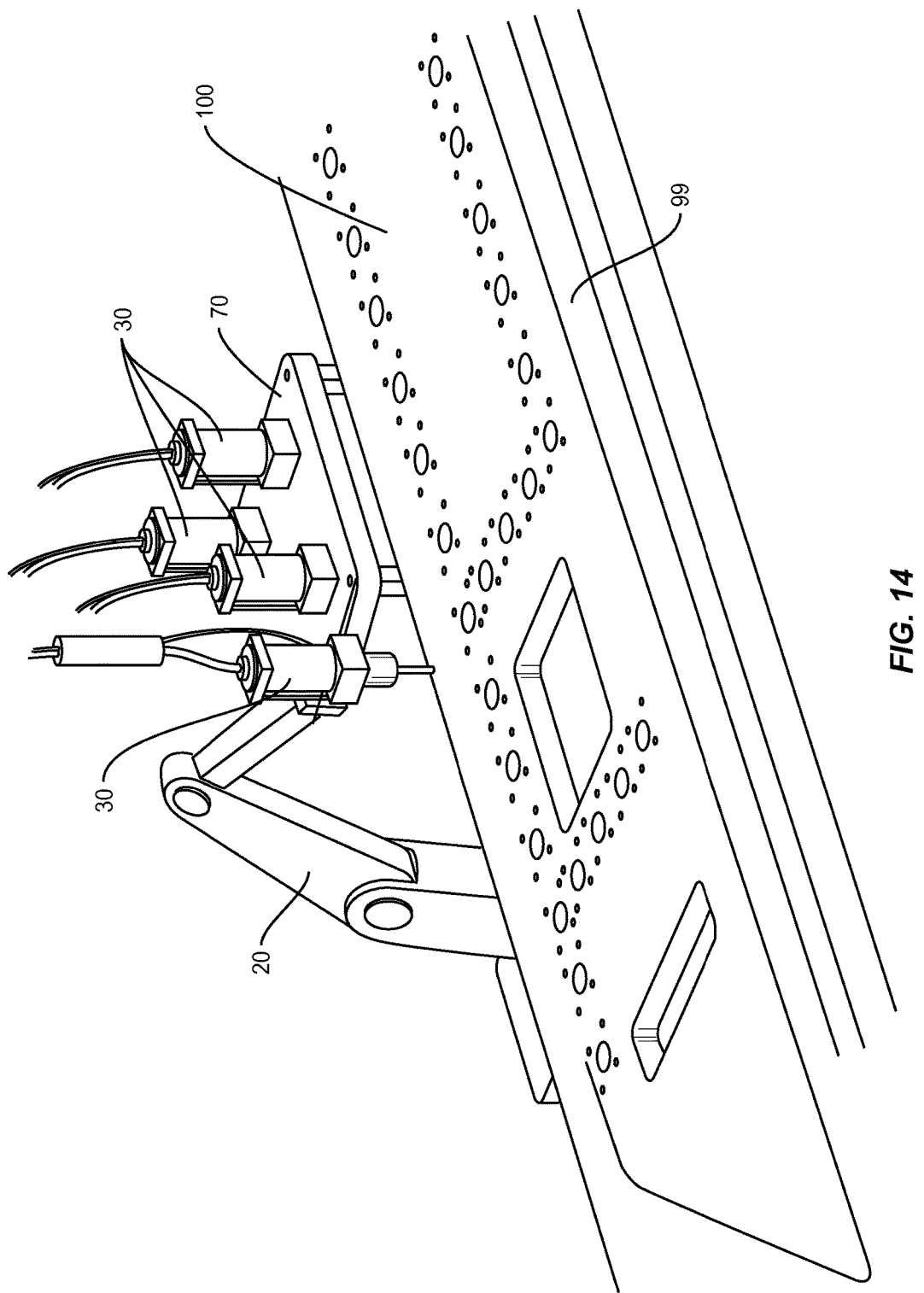
FIG. 14 is a perspective view of a robotic device positioning a tool relative to a work piece.

FIGS. 12-14 illustrate embodiments of robotic devices 20. The robotic devices 20 may include a variety of different configurations. The robotic devices 20 may be movable along a railing system 29, or may be fixed in position. The robotic devices 20 may include two or more sections that are pivotally connected together to movement within various planes. The various robotic devices 20 are each configured to engage with a tool 30. The engagement mechanisms provide for the robotic device 20 to move the tools 30 to the various locations about the work piece 100.

The tools 30 are each configured to perform an operation on the work piece 100. The tools 30 are able to operate mechanically when disengaged from the robotic device 20. The various tools 30 may each include the same or different shapes and/or sizes and/or configurations. When not in use, one or more of the tools 30 may be positioned at a docking station 70. The docking station 70 is located in proximity to the robotic device 20.

FIGS. 12-14 illustrate the robotic device 20 moving a single tool 30 into position for operation on the work piece 100. Multiple tools 30 are able to be moved and operate simultaneously on the work piece 100. FIG. 12 includes a robotic device 20 that is movable along a rail 29. The robotic device 20 is configured to engage with a tool 30 that is moved relative to a work piece 100. FIG. 13 includes a similar arrangement with the rail 29 being overhead (i.e., above the work piece 100). For rail-mounted robotic devices 20, the docking station 70 or a table for positioning tools 30 may be attached to or otherwise move with the robotic device 20 along the rail 29.

FIG. 14 includes a robotic device 20 that is mounted in proximity to an assembly line 99 that moves the work pieces 100. The robotic device 20 is configured to engage with a tool 30, with other tools 30 not in use being positioned adjacent to the robotic device 20 at a docketing station 70.

In the various systems, a single robotic device 20 may deliver the tools 30. The system 10 may also include two or more robotic devices 20 that deliver tools 30. These robotic devices 20 may be controlled by one or more system controllers 40.

The robotic devices 20 may be configured to move a single tool 30 at a time, or may be configured to simultaneously move multiple tools 30. The robotic devices 20 may include multiple engaging devices or otherwise provide for engaging with multiple tools 30. Further, multiple tools 30 may be configured into a single cluster. The robotic device 20 is able to engage with, move, and position the cluster at a new position thus providing for the multiple tools 30 to be moved together as a unit. The cluster may include any number of tools 30, and the cluster may include the same or different tools 30.

The tools 30 may be positioned at a docking station 70 when not in use. The docking station 70 may provide for replacing batteries within the tools 30. The station 70 may also be configured to provide diagnostic testing on the tools 30 to ensure proper operation. Further, tools 30 may be removed from the system 10 while idle in the docking station 70 in the event they are not in condition for operation. A variety of other maintenance operations may also be provided to the tools 30 while in this area. This increases the efficiency of the system 10 as the tools 30 can be prepped for future operation while they are idle. The tools 30 are put into a ready state for use by the robotic device 20.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of processing holes in a work piece, the method comprising:
engaging a first drill with a robotic device with the first drill being positioned at an engagement position of the robotic device;
moving the first drill with the robotic device to a first position on the work piece;
disengaging the first drill from the robotic device at the first position;
while the first drill is disengaged from the robotic device, drilling the work piece at the first position with the first drill; and
while the first drill is disengaged from the robotic device and drilling the work piece at the first position:
moving the robotic device away from the first position while the engagement position is unoccupied;
engaging a second drill with the robotic device with the second drill being positioned at the engagement position;
moving the second drill with the robotic device to a second position on the work piece;
disengaging the second drill from the robotic device at, the second position; and
while the second drill is disengaged from the robotic device, drilling the work piece with the second drill at the second position.

2. The method of claim 1, further comprising while each of the first and second drills are disengaged from the robotic device and drilling the work piece:
moving the robotic device away from the second position while the engagement position is unoccupied;
engaging a third drill with the robotic device with the third drill being positioned at the engagement position;
moving the third drill with the robotic device to a third position on the work piece;
disengaging the third drill from the robotic device at the third position; and
drilling the work piece with the third drill at the third position.

3. The method of claim 2, further comprising moving the robotic device to the first position on the work piece and re-engaging the first drill at the engagement position of the robotic device while the second and third drills are disengaged from the robotic device and drilling the work piece.

4. The method of claim 3, further comprising receiving a signal from the first drill indicating that the drilling at the first position is complete prior to moving the robotic device to the first position.

5. The method of claim 1, further comprising receiving a signal from the first drill indicating that the drilling at the first position is complete and re-engaging the first drill at the engagement position of the robotic device and moving the first drill to a docking station that is spaced away from the work piece.

6. The method of claim 1, wherein engaging the second drill with the robotic device occurs at a docking station that is spaced away from the work piece.

7. The method of claim 1, further comprising disengaging the second drill from the robotic device at the second position and moving the robotic device back to the first position while the first drill is still drilling the work piece at the first position.

8. The method of claim 1, further comprising disengaging the first drill from the robotic device at the first position while the first drill is not drilling the work piece.

9. The method of claim 1, further comprising determining a next position on the work piece for the first drill to drill while the first drill is disengaged from the robotic device and drilling the work piece at the first position.

10. The method of claim 1, further comprising while each of the first and second drills are drilling the work piece, moving the robotic device back to the one of the first and second drills based on determining which will complete the drilling soonest.

11. A system for performing manufacturing operations on a work piece, the system comprising:
   a robotic device with a movable arm and an engagement position on the arm;
   a plurality of drills each comprising a movable spindle configured to receive a drill bit, each of the plurality of drills being able to operated independently from the robotic, device;
   a control circuit that monitors the manufacturing operations on the work piece;
   the robotic device configured to receive instructions from the control circuit and responsive to the instructions perform the following:
      engage a first one of the drills at the engagement position of the robotic device;
      move the first drill to a first position on the work piece;
      disengage from the first drill when the first drill is at the first position;
      move the first drill away from the first position while the engagement position is unoccupied and while the first drill is drilling the work piece at the first position;
      engage a second drill at the engagement position while the first drill is drilling the work piece;
      move the second drill to a second position on the work piece while the first drill is drilling the work piece;
      disengage the second drill from the robotic device at the second position while the first drill is drilling the work piece ; and
      drill the work piece with the second drill at the second position while the first drill is drilling the work piece.

12. The system of claim 11, further comprising a tool control circuit that controls the plurality of drills, the tool control circuit being spaced away from the control circuit.

13. The system of claim 11, wherein the robotic device further comprises opposing arms that are movable between an open position to disengage from the drills and a closed position to engage with the drills.

14. The system of claim 11, wherein each of the first and second drills are the same.

15. The system of claim 11, wherein the robotic device includes a base that s located at a fixed position.

* * * * *